3,108,903
NEW AMPHOTERIC 2-IMINO-1,3-DI-N-HETEROCYCLES

Jakob Bindler, Riehen, near Basel, and Ernst Model, Basel, Switzerland, assignors to J. R. Geigy A.-G., Basel, Switzerland
No Drawing. Filed Mar. 30, 1959, Ser. No. 802,597
Claims priority, application Switzerland Apr. 25, 1958
7 Claims. (Cl. 117—138.5)

The present invention concerns new, heterocyclic nitrogen compounds which have cleansing and biocidal action. It concerns processes for the production of the new compounds as well as the use thereof for the cleansing and protection of organic materials of any type, as well as the material treated therewith.

It has been found that valuable cleansing agents having a protective action against bacteria and fungi are obtained which correspond to the general formula

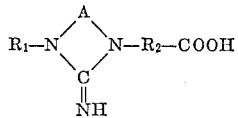  (I)

wherein
A represents a bivalent saturated hydrocarbon radical which completes the heterocyclic nucleus selected from the group consisting of the imidazolidine and hexahydropyrimidine series,
$R_1$ represents a lipophilic radical selected from the group consisting of dodecylbenzyl and $C_{10}$ to $C_{14}$ alkyl radicals, and
$R_2$ represents an alkylene radical with 1 to 3 carbon atoms,
if a compound of the general Formula II

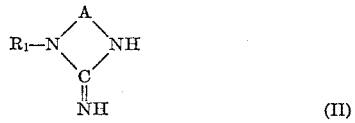  (II)

wherein $R_1$ and A have the meanings given above, are reacted with a halogen compound introducing a carboxyalkyl radical having 2-4 carbon atoms which contains the reactive halogen atom in the α- or β-position with regard to the carboxyl group.

The halogen compound introducing a carboxyalkyl radical corresponds to the general Formula III $$Hal-R_2-COOM \quad (III)$$

In this formula, "Hal" represents chlorine or bromine. The alkylene radical $R_2$ consists of 1 to 3 carbon atoms and contains the halogen in α- or β-position with regard to the carbonyl group. $R_2$ can be a straight or branched chain, for example the methylene, 1.1- or 1.2-ethylene, and the 1.1-, 1.2- or 2.2-propylene groups. M is either the equivalent of a cation, in this case in particular, an alkali metal, or an aliphatic radical in which case it is chiefly a lower alkyl radical such as, for example, the methyl or ethyl group.

If M is a lower alkyl group, then the ester group is saponified during or after the condensation.

In the general Formulae I and II, $R_1$ is advantageously a dodecyl or a tetradecyl radical; $R_1$, however, can also be, for example, a decyl radical. Compounds according to the present invention which contain the two radicals first mentioned are particularly active biocides.

The following radicals are examples of A in the Formulae I and II: alkylene radicals such as 1.2-ethylene, 1.2-propylene, 1.2- or 2.3-butylene, 1.3-propylene, 2-methyl-1.3-propylene radicals and cycloalkylene radicals such as 1.2-cyclopentylene or 1.2-cyclohexylene radicals and the homologous derivatives thereof.

Compounds of the general formula II used according to the present invention are obtained from N-monoalkyl-1.2- or 1.3-diaminoalkanes or -1.2-diaminocycloalkanes by reaction with cyanogen chloride or bromide. The monoalkyl radical corresponds to $R_1$.

Examples of α- or β-halogen carboxylic acid derivatives used according to the present invention are the esters and salts of bromo- and chloro-acetic acid, of α- or β-chloro- or bromo-propionic acid and of α- or β-chloro- or bromo-butyric acids, the salts of chloro-acetic acid being preferred.

A modification of the process for the production of 2-imino-1.3-di-heterocycles of the general Formula I according to the present invention consists in reacting cyanogen halide, in particular cyanogen chloride or bromide with a diamino compound of the general Formula IV $$R_1-NH-A-NH-R_2-COOM \quad (IV)$$

wherein the symbols A, $R_1$, $R_2$ and M have the meanings given above. In the compounds of the Formula IV, an aliphatic radical A having carbon atoms in the α.β- or α.γ-position can be bound to the nitrogen atom whereupon 5- or 6-membered heterocycles are formed. The carbon atoms of A which form the bridging member can be further substituted by lower alkyl groups or they can belong to a saturated ring.

Examples of compounds of the general Formula IV which are used according to the present invention are: N-decyl-N'-carboxy-methyl- or -carboxy-ethyl-1.2-diaminoethan, N-dodecyl-N'-carboxymethyl- or carboxyethyl-1.2-diaminoethane, N-tetradecyl-N'-carboxymethyl- or -carboxymethyl - 1.2 - diaminoethane, N-1-(4'-dodecyl)-phenyl-methyl-N'-carboxymethyl- or -carboxyethyl- 1.2-diaminoethane, N-dodecyl-N'-carboxymethyl- or -carboxy-1.3-diaminopropane, N-dodecyl-N'-carboxymethyl- or -carboxyethyl-1.2-diaminocyclohexane and N-dodecyl-N'-carboxymethyl- or -carboxyethyl-1.2-diaminocyclopentane. They are obtained, for example, by reacting one mole of a diamino compound of the general formula $$R_1-NH-A-NH_2$$

with one mole of an α- or β-halogen fatty acid. The radical $CH_2COOH$ can be introduced with the aid of formaldehyde and potassium cyanide and then saponification of the cyano group to the carboxyl group.

The 2-imino-1.3-di-N-hetocycles produced according to the present invention are colourless to slightly coloured, wax-like substances which are stable to light. In the form of their salts with acids or bases they dissolve very easily in water. The compounds are valuable biocidal agents which are distinguished by their great range of action, particularly good bactericidal and, also, their fungicidal or fungistatic activity. They also have a good algaecidal action. Due to their capillary action they are also valuable washing and wetting agents. The agents can be used alone, in solution or mixed with other washing or biocidal substances as well as with inert carriers or fillers, ointment bases, creams, etc. They can be used for the most various purposes. They can be well used for example in human and veterinary medicine as disinfectant and antiseptic cleansing agents as they have good to very good activity against *Staphylococci*, *Coli*, *Typhus*, *Paratyphus* and *Enteritis* bacilli as well as against pathogenic fungi such as, for example, *Ctenomyces interdigitalis*. Because of the good water solubility of their salts with acids or bases, the new compounds can be used advantageously also for the disinfection and antiseptic treatment of textiles, for example of woollen blankets, linen in hotels and restaurants and as shampoos. Textile fabric treated with a 1 to 2% aqueous solution of the compounds according to the present invention is, after drying, not only free from germs but also has certain long-lasting properties of a bacteriostatic and fungistatic nature. Textiles so treated do not become yellowish on long storage or exposure to light. The condensation products according to the invention can also be applied in organic solvents for the dry cleaning of textiles. The compounds according to the present invention can also be used for room disinfection, advantageously in the form of sprays and aerosols. They can also be used for the disinfection of apparatus and equipment in the household or in the foodstuff and fermentation branches of industry. Finally, another form of application is in cosmetics where the agents are used, for example, in ointments and creams and, in particular, in shampoos.

Further particulars can be seen from the following examples which do not limit the invention in any way. In these examples parts are given as parts by weight and the temperatures are in degrees centigrade. The relationship of parts by weight to parts by volume is as that of kilogrammes to litres.

*Example 1*

58 parts of 1-dodecyl-2-imino-imidazolidine hydrochloride and 21 parts of chloro-acetic acid are dissolved in 100 parts of water by gentle warming. At 30–35°, 91.8 parts of 18.3% caustic soda lye are poured in while stirring well. The mixture is stirred for 14 hours at room temperature and then for 2 hours at 90–95°. The clear, colourless solution obtained is then evaporated to dryness in a vacuum at 50–55°. The residue is dissolved in methyl alcohol and so much hydrogen chloride is introduced that a sample diluted with water and just turns Congo red paper blue, whereupon sodium chloride precipitates and is filtered off. The solvent is then removed from the filtrate by distillation in the vacuum. The greasy residue is dissolved in hot acetic ester. The hot solution is filtered. On cooling the filtrate to −10°, the reaction product separates first in oily form. The solvent is decanted off and the residue is dried. According to analysis and properties, the wax-like mass is the hydrochloride of 3-dodecyl-2-imino-imidazolidyl-1-acetic acid and corresponds to the formula:

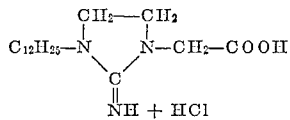

Analysis: C found, 58.67%; H found, 10.03%; N found, 11.95%. Calculated, 58.68%; H calculated, 9.84%; N calculated, 12.07%; Ionogenic Cl found, 10.41%. Ionogenic Cl calculated, 10.18%.

For most purposes, it is not necessary to isolate the pure compound. For example, the aqueous reaction solution can be used direct as biocidal cleansing agent for milk cans.

*Example 2*

68.4 parts of dodecyl ethylene diamine are emulsified in 400 parts of water and as much hydrochloric acid is added as corresponds to the dihydrohalide. 94.7 parts of 20.8% aqueous potassium cyanide solution and then 24.2 parts of 37.4% formaldehyde solution are added dropwise to the clear solution at 20–25°, and the mixture is stirred for 1 hour at room temperature. 60 parts of caustic soda are then added to the mixture and the whole is heated for 21 hours at 90–95°. The clear solution is then neutralised with concentrated hydrochloric acid until mimosa paper just turns red. The reaction mixture is evaporated to dryness in a vacuum at 70–75°. The residue is dissolved in 300 parts of cold methyl alcohol and undissolved sodium and potassium chloride are removed by filtration.

Cyanogen chloride is introduced into this solution at 10° until the reaction mixture has a neutral reaction to litmus paper. The reaction mixture is then saturated with hydrogen chloride until a sample diluted with water just turns Congo red paper blue, whereupon the sodium chloride precipitated is filtered off and the methyl alcohol is distilled off. The remaining wax-like mass is further purified as described in Example 1. According to analysis and properties, it is identical with the product obtained according to Example 1.

*Example 3*

58.8 parts of 15% caustic soda lye are added dropwise while stirring well to a solution of 13.5 parts of β-chloro-butyric acid and 29 parts of 1-dodecyl-2-amino-imidazolidine hydrochloride in 75 parts of water, the addition being made in such a way that the temperature does not rise above 35°. The reaction mixture is then stirred for 14 hours at room temperature and then for 2 hours at 90–95°. The mixture is then left to stand until two phases have formed whereupon the aqueous phase is removed and the oily phase can be used direct as biocidal cleansing agent.

If the reaction mass is further purified as described in Example 1, then a wax-like compound is obtained, the analysis and qualities of which correspond to the formula

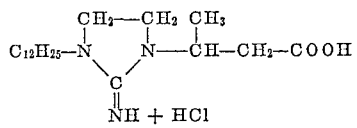

If, instead of 13.5 parts of β-chloro-butyric acid, 12 parts of α-chloro-propionic acid are used, then the compound of the following formula is obtained as reaction product:

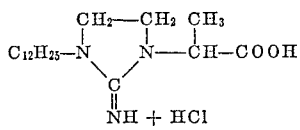

*Example 4*

A solution of 4.4 parts of caustic soda in 40 parts of water is added dropwise at a temperature not exceeding 35° to a mixture of 10.5 parts of chloro-acetic acid, 22.5 parts of 1-decyl-2-amino-imidazolidine and 30 parts of water. The reaction mixture is then stirred for 14 hours at room temperature and then for 1 hour at 90–95°. The clear solution formed can be used direct as biocidal cleansing agent. It contains the reaction product of the following constitution:

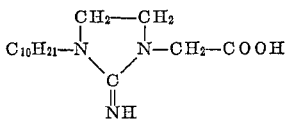

*Example 5*

34 parts of 1-dodecyl-2-imino-4.5-tetramethylene-imidazolidine hydrochloride and 10.5 parts of chloro-acetic acid are dissolved while warming in 95 parts of water and 25 parts of isopropyl alcohol. 58.8 parts of 15% caustic soda lye are added dropwise while stirring well at 30–35° to this solution. The reaction mixture is stirred for 12 hours at room temperature and then for 2 hours at 90–95°. After dilution with water, the clear solution can be used direct as biocidal cleansing agent. The product corresponds to the formula

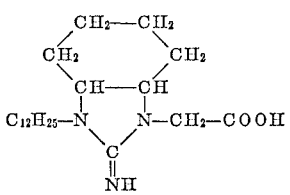

If in the above process instead of 1-dodecyl-2-imino-4.5-tetramethylene-imidazolidine hydrochloride, 1-decyl- 2 - imino - 4.5 - tetramethylene - imidazolidine hydrochloride is used, then a product which has similar properties is obtained.

Example 6

116.8 parts of 14.4% caustic soda lye are added dropwise to a mixture of 63.5 parts of tetradecyl-2-imino-imidazolodine hydrochloride, 21 parts of chloroacetic acid, 150 parts of water and 50 parts of isopropyl alcohol, the addition being made while cooling and stirring and in such a manner that the temperature does not rise above 35°. The reaction mixture is then stirred for 16 hours at room temperature and then for 3 hours at 80–85°. Sufficient hydrochloric acid is added to the clear solution to just turn Congo red paper blue whereupon the reaction mixture is evaporated to dry-next in a vacuum at 50–55°. The residue is dissolved in hot ethyl acetate and the sodium chloride is filtered off. On cooling the filtrate, the greasy reaction product separates out. The ethyl acetate is then decanted off and the wax which remains is dried in the vacuum at 80–85°. Elementary analysis shows the product has the following formula

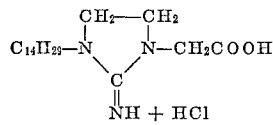

If instead of 21 parts of chloro-acetic acid, 27 parts of β-chlorobutyric acid or 24 parts of β-chloropropionic acid are used and the procedure described above is followed, then compounds having similar properties of the following formulae are obtained:

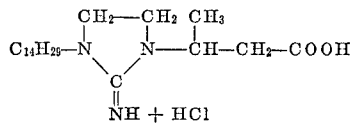

or

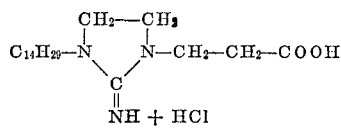

Example 7

A solution of 8.4 parts of caustic soda in 50 parts of water is added dropwise to a mixture of 30.5 parts of dodecyl - 2 - imino - hexahydropyrimidine hydrochloride, 10.5 parts of chloroacetic acid and 75 parts of water in such a manner that the temperature does not rise above 35°. The mixture is stirred for 18 hours at room temperature and then for 2 hours at 90–95°. The reaction mixture, which is obtained in two phases, is left to stand and the 60 parts of the aqueous phase are removed while still hot. The remaining, viscous phase can be used direct, after dilution with water as biocidal agent.

The active substance corresponds to the formula

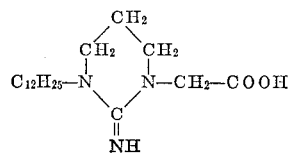

If in the above process instead of dodecyl-2-imino-hexahydropyrimidine hydrochloride, 1-dodecylbenzyl-2-iminohexahydropyrimidine hydrochloride is used, then a product having similar properties is obtained.

Example 8

47.1 parts of 1-dodecylbenzyl-2-imino-imidazolidine hydroiodide and 10.5 parts of chloroacetic acid are dissolved in a mixture of 75 parts of water and 50 parts of isopropyl alcohol. 8.4 parts of caustic soda dissolved in 50 parts of water are added to this solution dropwise in such a way that the temperature does not exceed 35°. The reaction mixture is stirred for 12 hours at room temperature and then for 3 hours at 80–85° The clear solution formed can be used as such as disinfectant. In hydrochloric acid solution, it contains the compound of the following constitution as active component:

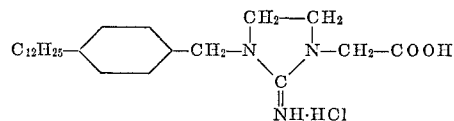

What we claim is:

1. A compound of the formula

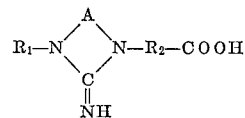

wherein

A is alkylene which completes the heterocyclic nucleus selected from the group consisting of the imidazolidine and hexahydropyrimidine nuclei, $R_1$ is a lipophilic radical selected from the group consisting of dodecylbenzyl and alkyl with 10 to 14 carbon atoms, and $R_2$ is an alkylene radical with 1 to 3 carbon atoms.

2. The compound of the formula

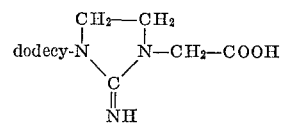

3. The compound of the formula

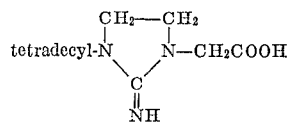

4. A compound of the formula

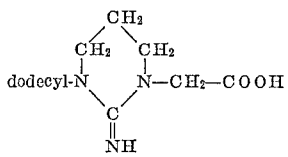

5. A compound of the formula

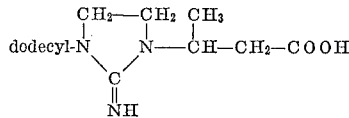

6. A compound of the formula

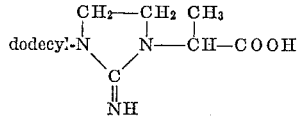

7. An organic material having an adherent coating of a compound of the formula

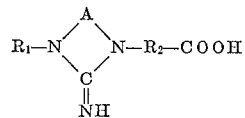

wherein A is alkylene which completes the heterocyclic nucleus selected from the group consisting of the imidazolidine and hexahydropyrimidine nuclei, $R_1$ is a lipophilic radical selected from the group consisting of dodecylbenzyl and alkyl with 10 to 14 carbon atoms, and $R_2$ is an alkylene radical with 1 to 3 carbon atoms, whereby the said material is protected against bacteria and fungi.

References Cited in the file of this patent

UNITED STATES PATENTS

| | | |
|---|---|---|
| 1,912,849 | Kranzlein et al. | June 6, 1933 |
| 1,962,109 | Alvord | June 5, 1934 |
| 2,285,410 | Bousquet et al. | June 9, 1942 |
| 2,422,899 | Curd et al. | June 24, 1947 |
| 2,689,249 | De Benneville et al. | Sept. 14, 1954 |
| 2,748,120 | Burtner | May 29, 1956 |

OTHER REFERENCES

Richter's Organic Chemistry, vol. IV, pages 4–5 (1947).
Elderfield: Jour. Org. Chem., vol. 17, pages 442–446 (1952).
Watanabe: Chem. Abstracts, vol. 50, col. 15928 (1956).
Chemical Abstracts, Formula Index, 5th Decennial Index, vol. 41–50, page 957F (1947–1956).
Elderfield: Heterocyclic Compounds, vol. 5, p. 244 (1957).